United States Patent  
Li

Patent No.: US 6,212,313 B1  
Date of Patent: Apr. 3, 2001

(54) OPTICAL INTERLEAVER

(75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/495,020

(22) Filed: Jan. 31, 2000

(51) Int. Cl.$^7$ .................................................. G02B 6/28
(52) U.S. Cl. ...................... 385/24; 359/117; 359/127; 385/39
(58) Field of Search ................................. 385/15, 24, 31, 385/39; 359/115, 117, 124–127

(56) References Cited

U.S. PATENT DOCUMENTS

| | | | |
|---|---|---|---|
| 5,606,439 | * 2/1997 | Wu | 359/117 |
| 5,694,233 | * 12/1997 | Wu et al. | 359/117 |
| 5,724,165 | * 3/1998 | Wu | 359/117 |
| 5,796,889 | * 8/1998 | Xu et al. | 385/24 |
| 5,912,748 | * 6/1999 | Wu et al. | 359/117 |
| 5,923,472 | 7/1999 | Bergmann | 359/618 |
| 6,005,697 | * 12/1999 | Wu et al. | 359/117 |
| 6,097,518 | * 8/2000 | Wu et al. | 359/128 |

* cited by examiner

Primary Examiner—Phan T. H. Palmer  
Assistant Examiner—Michelle R. Connelly-Cushwa  
(74) Attorney, Agent, or Firm—Lumen Intellectual Property Services

(57) ABSTRACT

An optical interleaver having a reflector that reflects an optical signal from one or more input/output ports back through the elements of the interleaver in reverse order to the input/output ports. The interleaver generally comprises a first birefringent element optically coupled to at least three input/output ports, first and second polarization rotators, a wavelength filter, a second birefringent element and the reflector. The interleaver may further comprise a compensation plate that compensates for phase differences due to different optical path lengths for ordinary and extraordinary rays in one of the birefringent elements. This configuration reduces the number of components required for the interleaver and allows the use of shorter birefringent elements. The interleaver may be configured to operate as a multiplexer, a de-multiplexer, or a router.

21 Claims, 7 Drawing Sheets

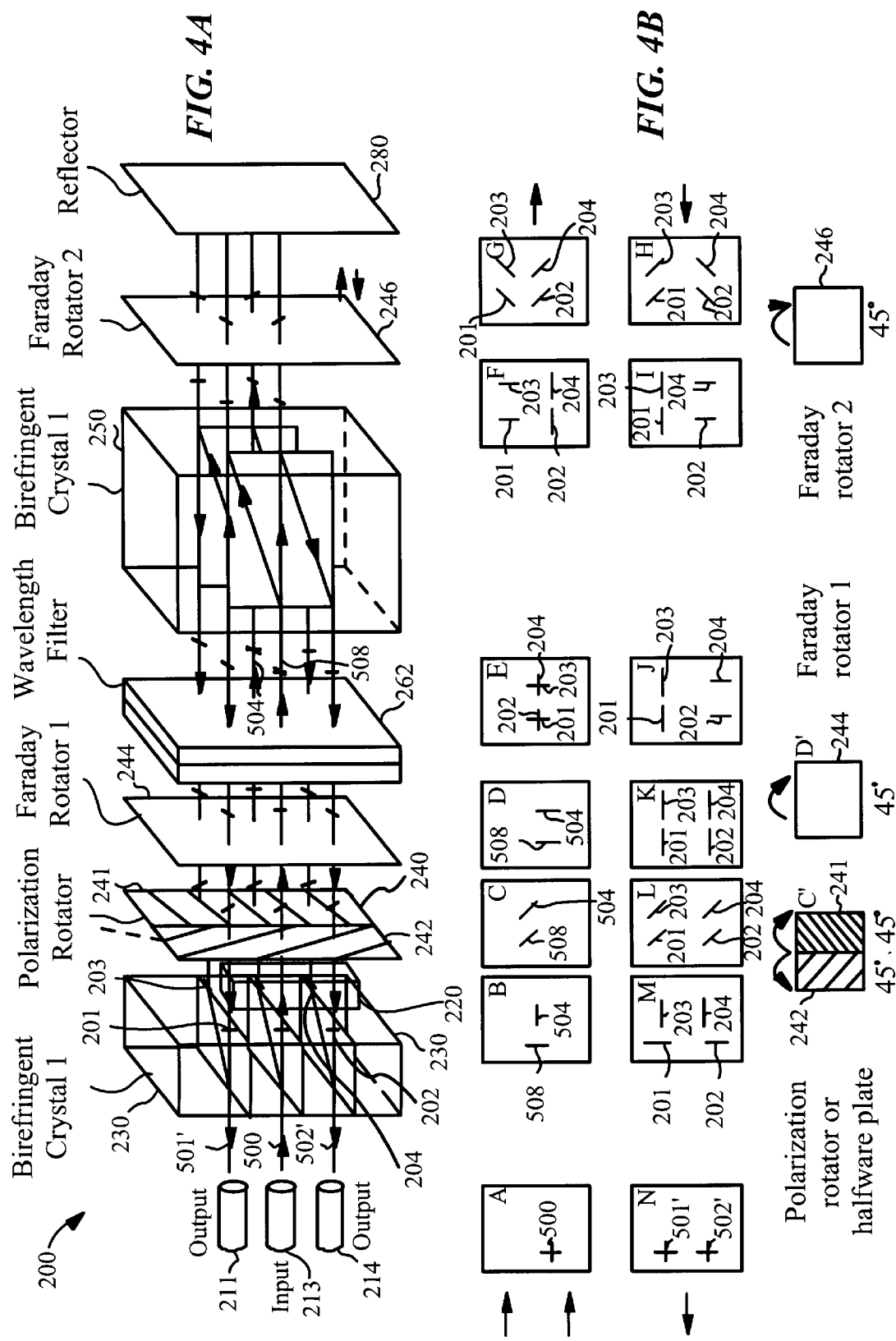

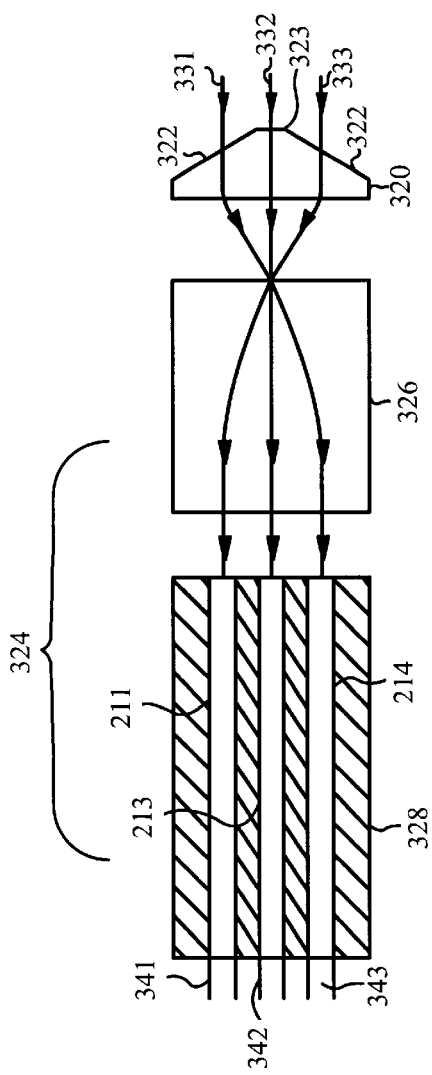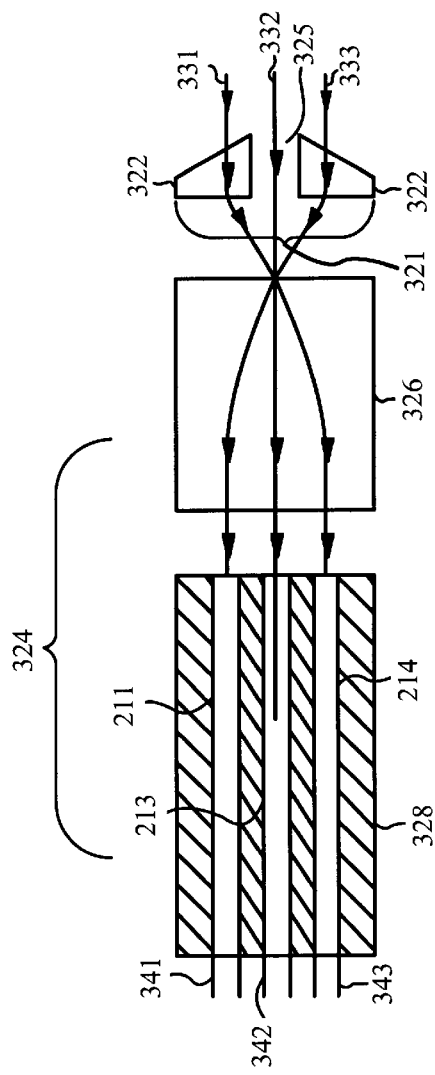

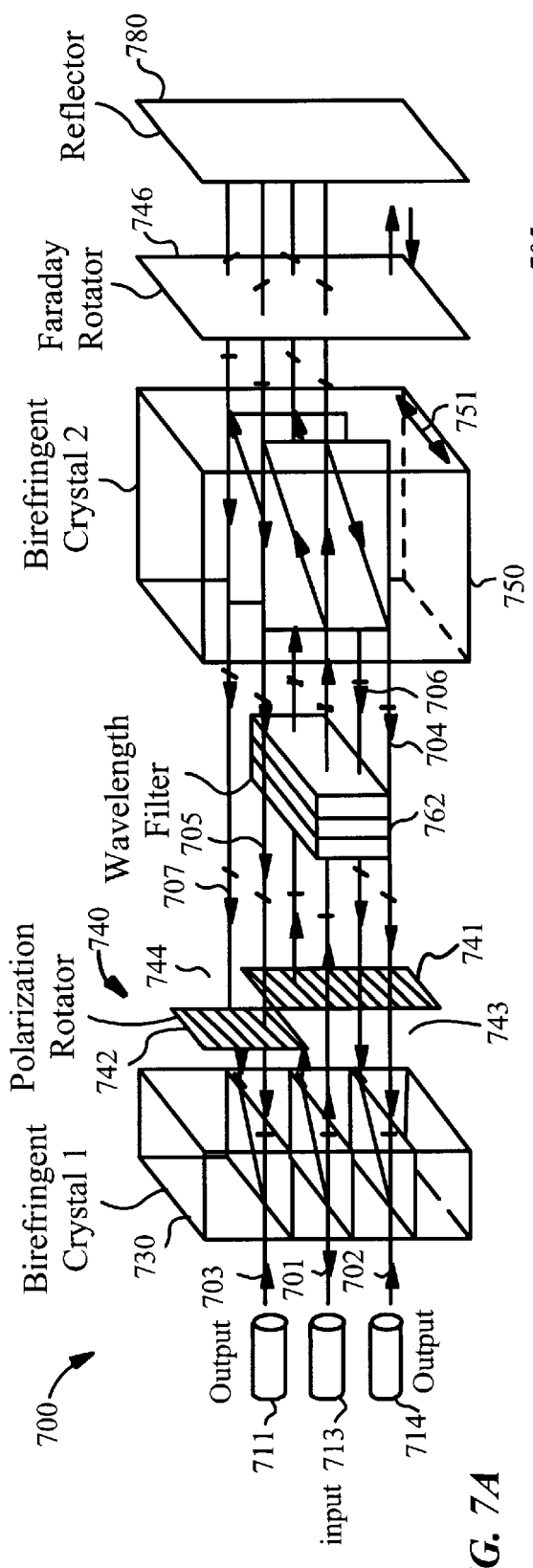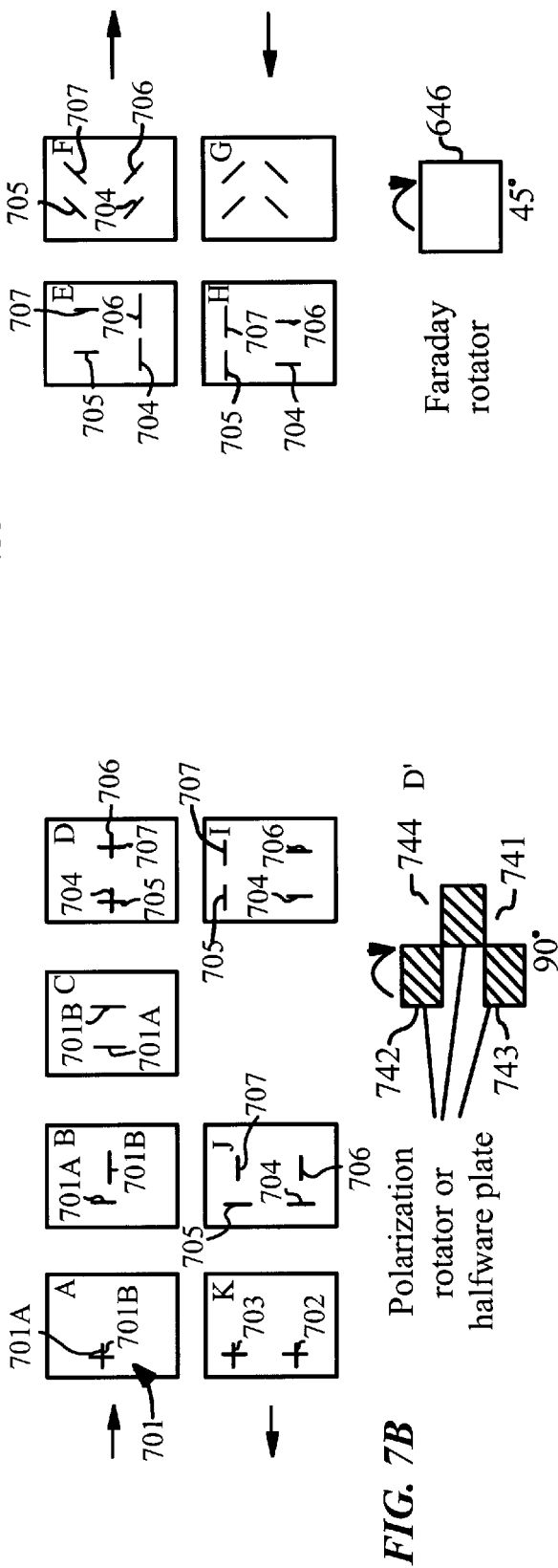
FIG. 7A
FIG. 7B

OPTICAL INTERLEAVER

CROSS REFERENCE TO RELATED APPLICATIONS

This application is related to U.S. patent application Ser. No. 09/494,969 filed Jan. 31, 2000, which is hereby incorporated by reference.

FIELD OF THE INVENTION

This invention relates generally to optical communications systems. More particularly, it relates to an optical interleaver for multiplexing or de-multiplexing optical signals.

BACKGROUND ART

Optical wavelength division multiplexing (WDM) has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

WDM systems use components referred to generically as optical interleavers to combine, split, or route optical signals of different channels. Interleavers typically fall into one of three categories, multiplexers, de-multiplexers and routers. A multiplexer takes optical signals of different channels from two or more different input ports and combines them so that they may be coupled to an output port for transmission over a single optical fiber. A de-multiplexer divides an signal containing two or more different channels according to their wavelength ranges and directs each channel to a different dedicated fiber. A router works much the same way as a de-multiplexer. However a router can selectively direct each channel according to control signals to a desired coupling between an input channel and an output port.

FIG. 1 depicts a typical optical interleaver 999 of the prior art as described in U.S. Pat. No. 5,694,233, issued to Wu et al. on Dec. 2, 1997, which is incorporated herein by reference for all purposes. A WDM signal 500 containing two different channels 501, 502 enters interleaver 999 at an input port 11. A first birefringent element 30 spatially separates WDM signal 500 into horizontal and vertically polarized components 101 and 102 by a horizontal walk-off. Component signals 101 and 102 both carry the full frequency spectrum of the WDM signal 500.

Components 101 and 102 are coupled to a polarization rotator 40. The rotator 40 selectively rotates the polarization state of either signal 101 or 102 by a predefined amount. By way of example, in FIG. 1 signal 102 is rotated by 90° so that signals 103, 104 exiting rotator 40 are both horizontally polarized when they enter a wavelength filter 61.

Wavelength filter 61 selectively rotates the polarization of wavelengths in either the first or second channel to produce filtered signals 105 and 106. For example wavelength filter 61 rotates wavelengths in the first channel 501 by 90° but does not rotate wavelengths in the second channel 502 at all.

The filtered signals 105 and 106 enter a second birefringent element 50 that vertically walks off the first channel into beams 107, 108. The second channel forms beams 109, 110.

A second wavelength filter 62 then selectively rotates the polarizations of signals 107, 108 but not signals 109, 110 thereby producing signals 111, 112, 113, 114, having polarizations that are parallel each other. A second polarization rotator 41 then rotates the polarizations of signals 111 and 113, but not 112 and 114. The resulting signals 115, 116, 117, and 118 then enter a third birefringent element 70. Note that second wavelength filter 62 may alternatively be replaced by a polarization rotator 41 suitably configured to rotate the polarizations of signals 111, 113 but not 112, 114.

Third birefringent element 70 combines signals 115 and 116, into the first channel, which is coupled to output port 14. Birefringent element 70 also combines signals 117 and 118 into the second channel, which is coupled into output port 13.

As described above, interleaver 999 operates as a de-multiplexer. By operating interleaver 999 in reverse, i.e., starting with channels 501, 502 at ports 13 and 14 respectively, interleaver operates as a multiplexer. Furthermore, by suitably controlling the polarization rotation induced by rotators 40 and 41, interleaver 999 may be configured to operate as a router.

Interleaver 999 has certain drawbacks. First, each port requires its own collimator. Three collimators take up space and require a relatively large walk-off distance for the signals. Consequently, birefringent elements 30, 50 and 70 tend to be both long and wide. Second, the number of components, particularly birefringent elements, tends to make interleaver 999 bulky, expensive and more massive. Generally, the greater the mass of interleaver 999, the more unstable its operation. Third, the coupling distance, i.e., the distance between port 11 and ports 13, 14, tends to be long, which increases insertion losses in interleaver 999. Furthermore, each of the ports 11, 13 and 14 requires a separate collimator to couple the signals into and out of optical fibers. This adds the complexity and expense of interleaver 999.

There is a need, therefore, for an improved optical interleaver that overcomes the above difficulties.

OBJECTS AND ADVANTAGES

Accordingly, it is a primary object of the present invention to provide a compact optical interleaver that uses fewer parts. It is a further object of the invention to provide an interleaver with a single collimator for coupling optical signals to or from two or more optical fibers.

SUMMARY

These objects and advantages are attained by an optical interleaver having a compact design that allows the use of smaller birefringent elements. The interleaver generally comprises a first birefringent element optically coupled to at least two input/output ports. A first polarization rotator is optically coupled to the first birefringent element. A wavelength filter is optically coupled to the first polarization rotator element, and a second birefringent element is optically coupled to the wavelength filter. A second polarization rotator and a reflector are optically coupled to second birefringent element. The reflector reflects an optical signal that travels from the input/output ports through the elements of the interleaver back through these elements in reverse order back to the input/output ports. Usually, the input/output ports are all located on the same side of the first birefringent element. This compact configuration reduces the number of components required for the interleaver and allows the use of shorter birefringent elements. The interleaver may be configured to operate as a multiplexer, a de-multiplexer, or a router.

Embodiments of the interleaver may include a compensation plate that compensates for a phase difference due to different optical path lengths for ordinary and extraordinary rays travelling in the first birefringent element. Alternative embodiments include gaps in the first polarization rotator or wavelength filter to allow beams on either the forward or reverse path to bypass these elements. Such a configuration reduces the number of components, thereby reducing insertion losses and cost.

Further advantages of the various embodiments of the invention are depicted in the drawings and the detailed description that follows.

BRIEF DESCRIPTION OF THE FIGURES

FIG. 4A depicts an isometric view of an optical interleaver configured as a de-multiplexer according to a third embodiment of the present invention;

FIG. 4B depicts cross sectional schematic views of the polarization of light at different points in the optical interleaver of FIG. 4A;

FIG. 5A depicts an embodiment of a collimator used with the embodiments of the interleaver of the present invention;

FIG. 5B depicts an alternative embodiment of the collimator of FIG. 5A;

FIG. 7A depicts an isometric view of an optical interleaver according to a fifth embodiment of the present invention;

FIG. 7B depicts cross sectional schematic views of the polarization of light at different points in the optical interleaver of FIG. 7A.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
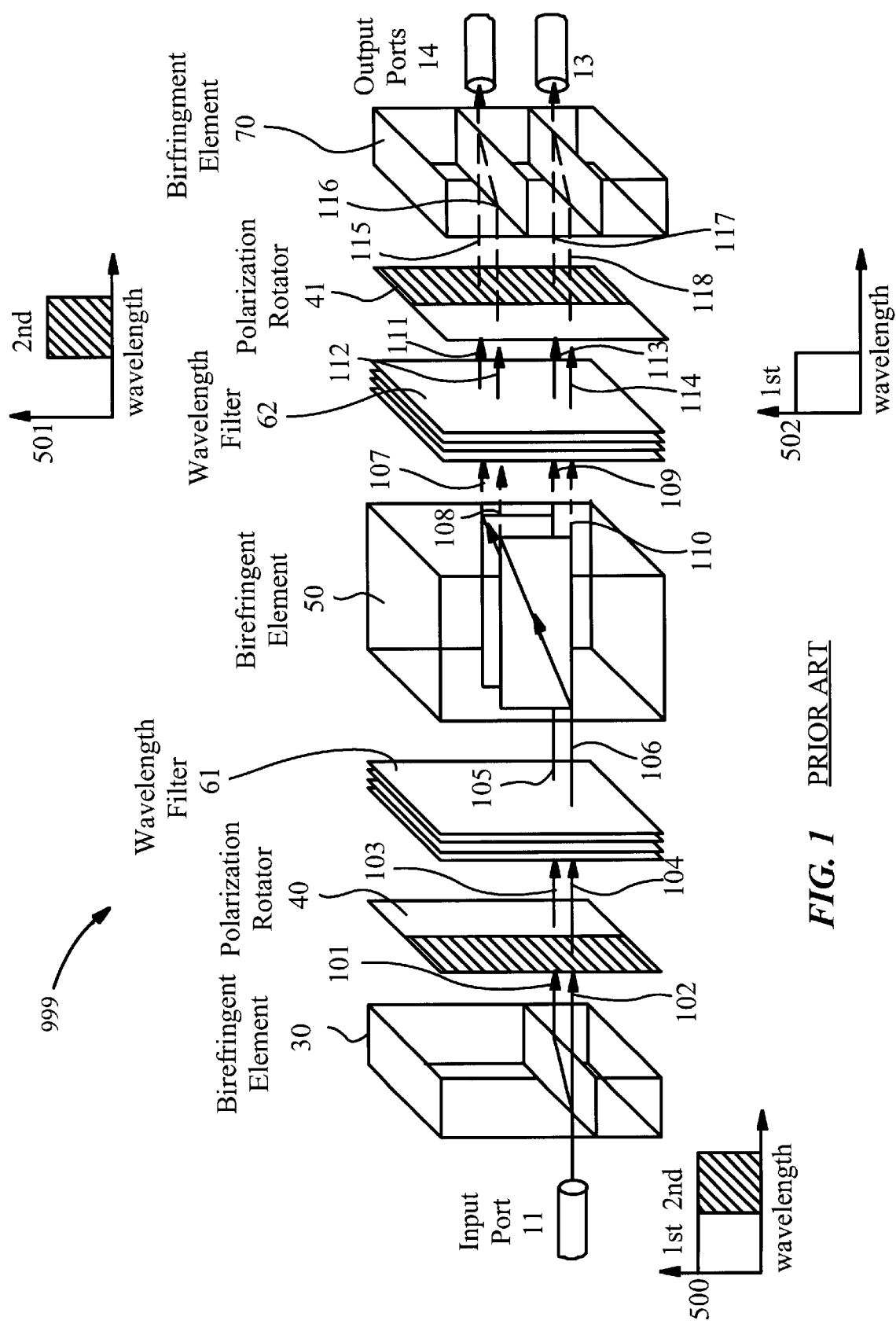
FIG. 1 depicts an isometric view of an optical interleaver according to the prior art.
Figure 2:
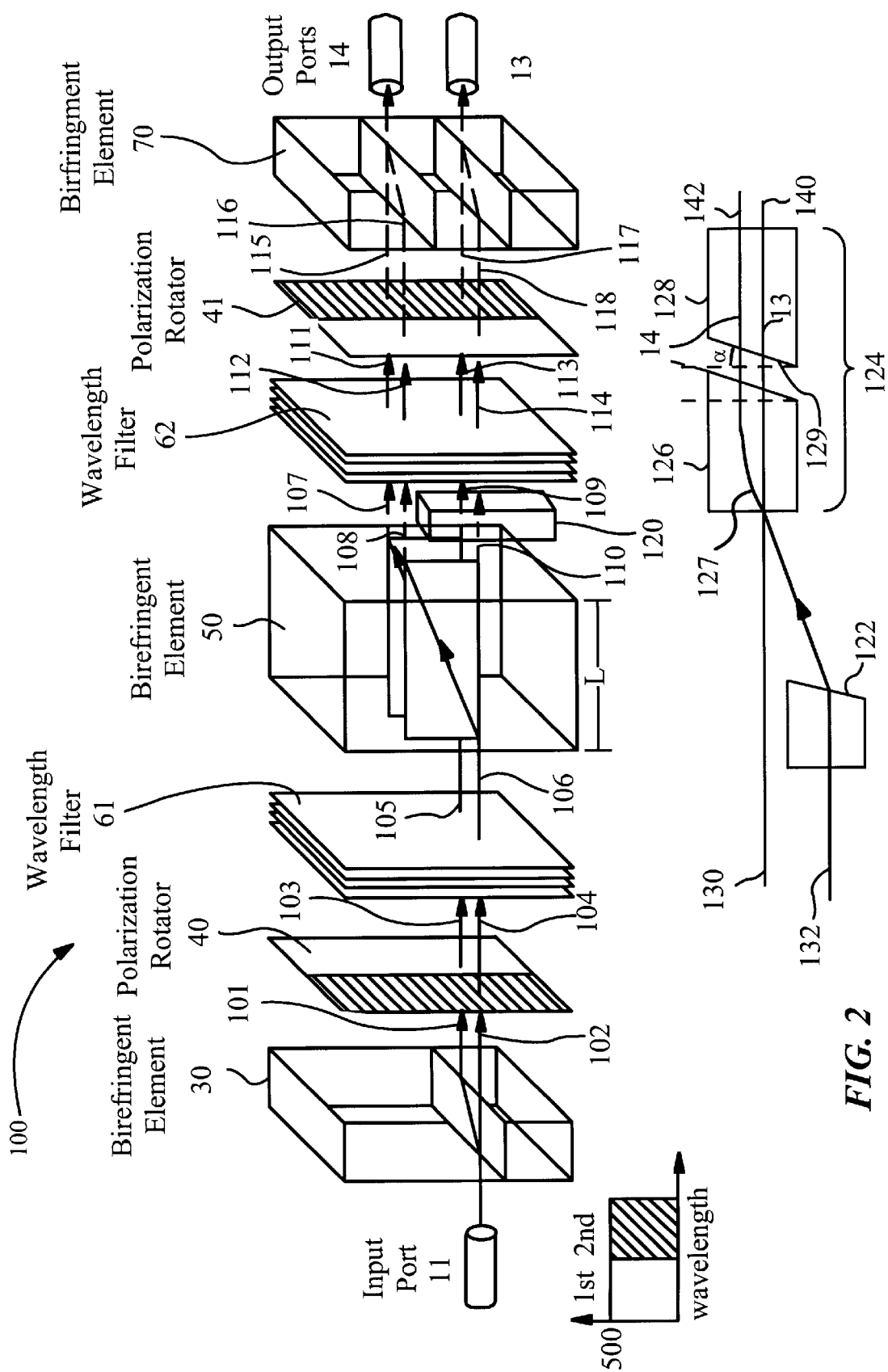
FIG. 2 depicts an isometric view of an optical interleaver according to a first embodiment of the present invention.

A first embodiment of the optical interleaver is shown in FIG. 2. The interleaver 100 is configured much the same way as interleaver 999 of FIG. 1 and operates in a similar fashion. However, interleaver 100 includes a deflection plate 120 disposed between birefringent element 50 and input/output ports 13 and 14. Deflection plate 120 may be located between birefringent element 50 and wavelength filter 62, or between wavelength filter 62 and rotator 41, or between rotator 41 and birefringent element 70, or between birefringent element 70 and ports 13, 14. For the sake of example, FIG. 2 depicts deflection plate 120 as being located between birefringent element 50 and wavelength filter 62 in the path of beams 109, 110.

Examples of suitable materials for construction of birefringent elements include calcite, rutile, lithium niobate, $YVO_4$ based crystals, and the like.

Suitable polarization rotators include reciprocal rotators such as waveplates and non-reciprocal rotators such as magneto-optic based Faraday rotators.

In an alternative embodiment depicted in the inset of FIG. 2, a wedge shaped deflection plate 122 combined with a dual fiber collimator 124 couples two different beams 130 and 132 to two different fibers 140, 142 coupled to ports 13 and 14. Initially beams 130 and 132 are parallel to each other. Beam 130 is enters collimator 124 at normal incidence. Consequently, the path of beam 130 travels substantially undeflected to optical fiber 140. Wedge 122 deflects beam 132 into collimator 124. Collimator 124 generally comprises a lens 126 and a capillary 128, which holds fibers 140, 142. Capillary 128 usually has a front surface 129 that is polished at an angle α with respect to a plane perpendicular to beam 130. Angle α is typically between 8 and 10°. This configuration reduces the amount of light from beams 130, 132 reflected back into fibers 140, 142.

Lens 126 is typically a graded refractive index (GRIN) lens. Beam 132 strikes lens 126 at an angle. As a result, beam 132 follows a curved path 127 that brings beam 132 parallel to beam 130 at fiber 142. The advantage of this particular configuration is that only one collimator 124 is used and fibers 140 and 142 may be located close to each other, thereby saving space. Furthermore beams 107, 108, 109, and 110 can be closer together. Therefore, birefringent element 50 can be smaller further reducing the cost of interleaver 100.

FIG. 3 depicts an embodiment of an optical interleaver 200 that uses even fewer components than interleaver 100 does. Interleaver 200 generally comprises three input/output ports 211, 213, and 214, first and second birefringent elements 230, 250, a deflection plate 220, a wavelength filter 262, polarization rotators 240, 244, 246 and a reflector 280.

Input/output ports 211, 213, and 214 are optically coupled to first birefringent element 230. Each of ports 211, 213, and 214 may be used for either input or output of optical signals depending on the desired application of interleaver 200. The distinction between input and output in the context of the present description is that an input couples light into interleaver 200 and an output couples light out of interleaver 200. Preferably, all three ports are located adjacent to each other on the same side of birefringent element 230, i.e., on the same side of interleaver 200. This configuration saves space and simplifies the design and construction of interleaver 200.

Figures 3A, 3B:
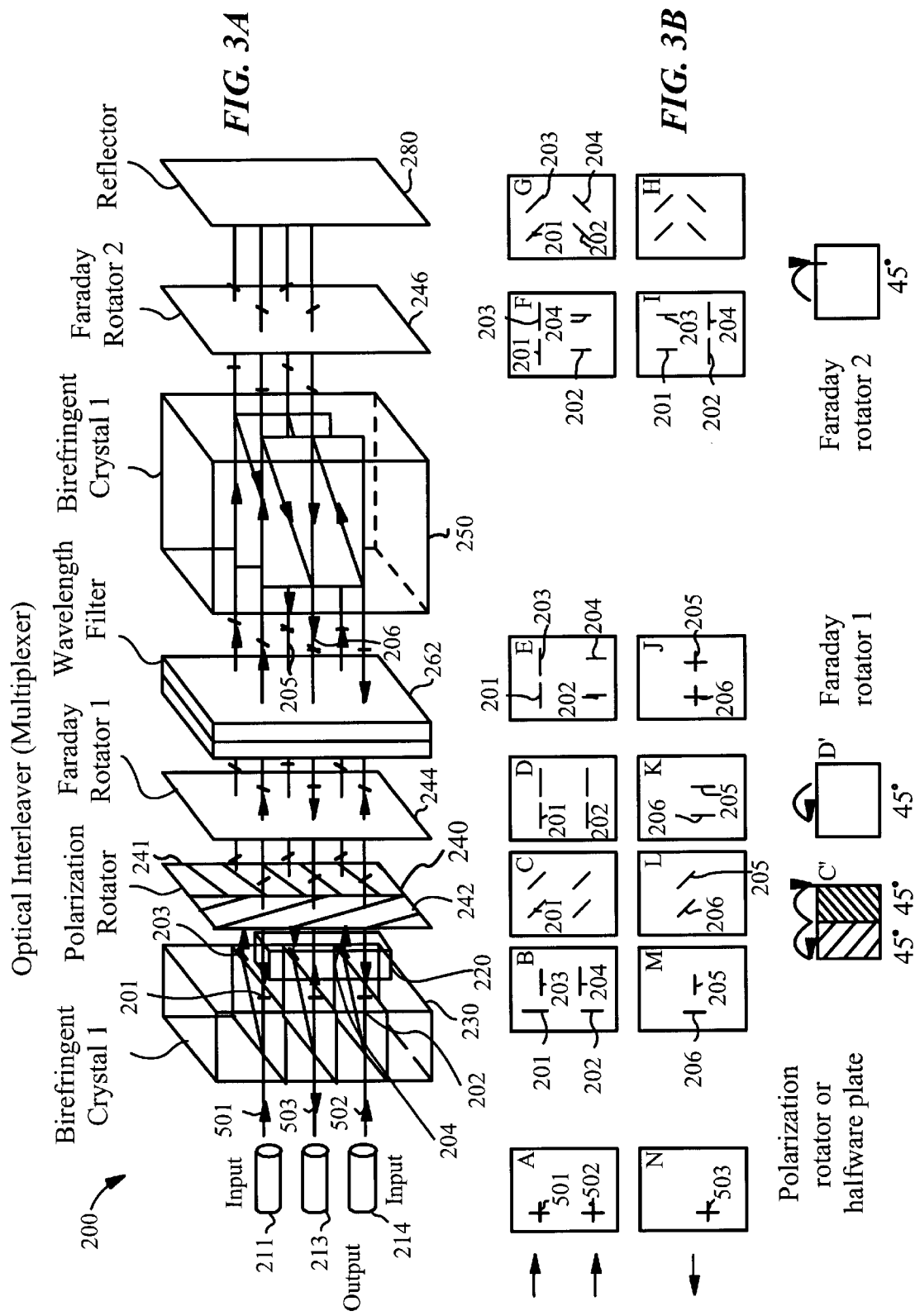
FIG. 3A depicts an isometric view of an optical interleaver configured as a multiplexer according to a second embodiment of the present invention.
FIG. 3B depicts cross sectional schematic views of the polarization of light at different points in the optical interleaver of FIG. 3A.

To understand the operation of interleaver 200 as a multiplexer, it is best to refer to FIGS. 3A and 3B simultaneously. Each of cross sections A through N depicted in FIG. 3B shows a view looking input/output ports 211, 213, 214 at different points in interleaver 200. In the following discussion ports 211 and 214 are inputs and port 213 is an output. Signals 501 and 502 enter interleaver 200 at ports 211, 214 as shown at A in FIG. 3B. Each of signals 501 and 502 carries a channel distinguished by a characteristic wavelength range. First birefringent element 230 spatially separates signals 501 into two polarized components 201, 203, and signal 502 into two polarized components 202 and 204 by a horizontal walk-off effect as shown at B in FIG. 3B.

Ordinary components 201 and 202 pass through deflection plate 220 while extraordinary components 203 and 204 do not. Deflection plate 220 thus compensates for the difference in phase resulting from the longer optical paths for the extraordinary components 203, 204 in birefringent crystal 230.

Components 201, 202, 203, and 204 are coupled to first polarization rotator 240. Rotator 240 is divided into first and second portions 241, 242 that rotate the polarization of light in opposite senses as shown at C' in FIG. 3B. A first portion 241 of rotator 240 selectively rotates the polarization of components 201 and 202 by 45° in a counter-clockwise sense. A second portion 242 of rotator 240 rotates the polarization of components 203, and 204 by 45° in a clockwise sense so components 201, 202, 203, and 204 are all polarized parallel to each other as shown at C in FIG. 3B. Preferably both portions of rotator 240 are reciprocal rotators, such as waveplates. A reciprocal rotator rotates the polarization of light in one sense when the light travels through it in a forward direction and in an opposite sense when light travels through it in the reverse direction.

All four components 201, 202, 203, and 204 are coupled to second polarization rotator 244. Preferably, rotator 244 is a non-reciprocal rotator such as a Faraday rotator. Rotator 244 rotates the polarization of all four components 201, 202, 203, and 204 by 45° counter-clockwise so that they are all horizontal as shown at D in FIG. 3B. The four components are then optically coupled to wavelength filter 262.

Wavelength filter 262 selectively rotates the polarization of wavelengths in either the first or second channel. For example filter 262 rotates the polarization of wavelengths corresponding to signal 502 by 90°. As a result components 202 and 204 are rotated by 90° while components 201 and 203 are not. Thus, components 201 and 203 of signal 501 are horizontally polarized but components 202 and 204 of signal 502 are vertically polarized as shown at E in FIG. 3B.

All four components 201, 202, 203, and 204 are coupled to second birefringent element 250. Birefringent element 250 has an optic axis 251 configured such that vertically polarized components 202, 204 are extraordinary rays and horizontally polarized components 201, 203 are ordinary rays. Second birefringent element 250 therefore vertically walks components 202 and 204 towards components 201, 203 as shown at F in FIG. 3B.

To allow a shorter length of second birefringent element 250, components 201, 202, 203, and 204 are coupled to third rotator 246 and reflector 280. Reflector 280 reflects components 201, 202, 203, and 204 back through the optical elements of interleaver 200 in reverse order. Rotator 246 is preferably a non-reciprocal rotator like rotator 244. Rotator 246 rotates the polarizations of components 201, 202, 203, and 204 by 45° clockwise as shown at G in FIG. 3B. Upon reflection by reflector 280 the polarizations of components 201, 202, 203, and 204 are configured as shown at H in FIG. 3B. For cross sections H–N, the view is now along the direction of propagation, i.e., towards left in FIG. 3A.

After reflection by reflector 280, rotator 246 again rotates components 201, 202, 203 and 204. Since rotator 246 is non-reciprocal, the components are again rotated clock-wise by 45° so that components 202, 204 are polarized horizontally and components 201, 203 are polarized vertically as shown at I in FIG. 3B. As such, components 202, 204 are ordinary rays and components 201, 203 are extraordinary rays on the return trip through birefringent element 250. Therefore, birefringent element 250 walks beams 201, 203 towards beams 202, 204. Beam 201 combines with beam 202 to form beam 206 and beam 203 combines with beam 204 to form beam 205 as shown at J in FIG. 3B.

Beams 205 and 206 then pass back through wavelength filter 262 where the horizontally polarized components corresponding to wavelengths in signal 502 are rotated by 90° such that all wavelengths in signals 205 and 206 are vertically polarized as shown at K in FIG. 3B. Signals 205 and 206 then pass back through rotator 244, which rotates their respective polarizations by 45° counter-clockwise as shown at L in FIG. 3B. Rotator 240 then rotates the polarization of signal 205 counter-clockwise and the polarization of signal 206 clockwise as shown at M in FIG. 3B. Beam 205 is therefore an extraordinary ray in birefringent element 230. Vertically polarized beam 206 is an ordinary ray in birefringent element 230. Beam 206 passes through deflection plate 220, but beam 205 does not. Deflection plate 220 compensates for a phase difference induced by the longer optical path length for extraordinary beam 206. Birefringent element 230 walks beam 205 towards 206 and combines them into output signal 503 as shown at N in FIG. 3B. Output signal 503 is then coupled to output port 213.

As described above, interleaver 200 operates as a multiplexer. By operating interleaver 200 in reverse, i.e. starting with a multiplexed signal containing two or more channels at input/output ports 213 interleaver 200 may be configured to operate as a de-multiplexer.

FIG. 4A depicts an embodiment of optical interleaver 200 configured to operate as a de-multiplexer. FIG. 4B depicts the operation of each element of interleaver 200 in this configuration. In this embodiment, port 213 serves as an input while ports 211 and 214 serve as outputs. WDM signal 500 containing channels 501 and 502 enters interleaver 200 at port 213 as shown at A in FIG. 4B. Channel 501' includes a vertically polarized component 201 and a horizontally polarized component 203. Similarly channel 502' includes a vertically polarized component 202 and a horizontally polarized component 204. First birefringent element 230 spatially separates WDM signal 500 into vertically and vertically polarized components 508, 504 by a horizontal walk-off effect as shown at B in FIG. 4B.

Ordinary component 508 passes through deflection plate 220 while extraordinary component 504 does not. Deflection plate 220 thus compensates for the difference in phase resulting from the longer optical paths for extraordinary component 504.

Components 508, and 504 are respectively coupled to first and second portions 241, 242 of polarization rotator 240. Portions 241, 242 rotate the polarization of light in opposite senses as shown a C' in FIG. 4B. First portion 241 of rotator 240 selectively rotates the polarization of component 508 by 45° in a counter-clockwise sense. Second portion 242 of rotator 240 rotates the polarization of component 504 by 45° in a clockwise sense so that components 508 and 504 are all polarized parallel to each other as shown at C in FIG. 4B. Both portions 241, 242 of rotator 240 are preferably reciprocal rotators as described above.

Both components 508, and 504 are coupled to non-reciprocal polarization rotator 244. Unlike the multiplexer case described above, rotator 244 rotates the polarization of both components 508, and 504 by 45° clockwise so that they are both vertical as shown at D in FIG. 4B. The two components are then optically coupled to wavelength filter 262.

Wavelength filter 262 selectively rotates the polarization of wavelengths in either the first or second channel. For example filter 262 rotates the polarization of wavelengths corresponding to signal 502' by 90°. As a result components 202 and 204 are rotated by 90° while components 201 and 203 are not. Thus, components 201 and 203 of signal 501' are horizontally polarized but components 202 and 204 of signal 502' are vertically polarized as shown at E in FIG. 4B.

Components 508 and 504, i.e., components 201, 202, 203, and 204, are coupled to second birefringent element 250. Birefringent element 250 has an optic axis 251 configured such that components 201 and 203 vertically walk off from components 202, 204 as shown at F in FIG. 4B.

Components 201, 202, 203, and 204 are coupled to non-reciprocal rotator 246 and reflector 280. Rotator 246 rotates the polarizations of components 201, 202, 203, and 204 by 45° clockwise as shown at G in FIG. 4B. Reflector 280 reflects components 201, 202, 203, and 204 back through the optical elements of interleaver 200 in reverse order. Upon reflection by reflector 280 the polarizations of components 201, 202, 203, and 204 are configured as shown at H in FIG. 4B. In cross-sections H–N, the view along the direction of propagation is now towards left in FIG. 4A.

After reflection by reflector 280, components 201, 202, 203, and 204 are again rotated 45° clockwise by rotator 246 so that components 202, 204 are polarized vertically and components 201, 203 are polarized horizontally as shown at I in FIG. 4B. As such, components 201, 203 are ordinary rays and components 202, 204 are extraordinary rays on the return trip through birefringent element 250. Therefore, birefringent element 250 walks beams 202, 204 away from beams 201 203 as shown at J in FIG. 4B.

Beams 201, 202, 203 and 204 then pass back through wavelength filter 262 where the horizontally polarized components 202, 204 corresponding to wavelengths in signal 502 are rotated by 90°. Consequently, all wavelengths in signals 201, 202, 203 and 204 are horizontally polarized as shown at K in FIG. 4B. Beams 201, 202, 203 and 204 then pass back through rotator 244, which rotates their respective polarizations by 45° clockwise as shown a L in FIG. 4B. Rotator 240 then rotates the polarizations of beams 201, 202 counter-clockwise and the polarizations of beams 203, 204 clockwise as shown at M in FIG. 4B. Beams 201, 202 are therefore extraordinary rays in birefringent element 230 while beams 203, 204 are ordinary rays. Therefore, birefringent element 230 walks beams 201, 202 towards beams 203, 204. Ordinary beams 203, 204 pass through deflection plate 220 but extraordinary beams 201, 202 do not, thereby compensating for phase differences. Beam 201 combines with beam 203 to form output signal 501' and beam 202 combines with beam 204 to form output beam 502' as shown at N in FIG. 4B. Output signals 501', 502' are then coupled to output port 211, 214 respectively.

Those skilled in the art will recognize that interleaver 200 may operate as both a multiplexer or de-multiplexer whether or not the sense of rotation of rotator 244 is reversed. This may be accomplished, for example, by reversing the direction of the magnetic field if rotator 244 is a Faraday rotator. Those skilled in the art will also recognize that, by suitably controlling the polarization rotation induced by rotators 240 and 244, interleaver 200 may be configured to operate as a router.

In alternative embodiments depicted in FIGS. 5A and 5B input/output ports 211, 213 and 214 can be combined with a wedge shaped deflection plate 320 and a triple fiber collimator 324 to couple three different beams 331, 332, and 333 to three different fibers 341, 342, and 343. Initially beams 331, 332 and 333 are parallel to each other. As depicted in FIG. 5A, deflection plate 320 includes two wedge-shaped portions 322 and a central portion 323 having parallel front and back sides. Beam 332 enters central portion 323 deflection plate 320 at normal incidence as shown in FIG. 5A. Beam 332 is, therefore, undeflected and travels substantially undeflected to optical fiber 342. Wedge shaped portions 322 deflect beams 331 and 333 into collimator 324. Alternatively, as depicted in FIG. 5B, a deflection plate 321 may include two wedge-shaped portions 322 with a central gap 325 in between, beam 332 passes undeflected through gap 325. Wedge shaped portions 322 deflect beams 331 and 333 into collimator 324. Deflection plate 320 or 321 may be made in a single piece or multiple pieces. Furthermore, deflection plate 320 or 321 may be axially symmetric about an axis defined, for example, by the path of central beam 332.

Collimator 324 generally comprises a lens 326 and a capillary 328. Lens 326 is typically a graded refractive index (GRIN) lens. Capillary 328 holds fibers 341, 342, 343. Beam 332 strikes a central portion of lens 326 at normal incidence. As a result, beam 332 proceeds undeflected to fiber 342. Beams 331 and 333 strike lens 326 at an angle. As a result, beams 331 and 333 follow curved paths 327, 329 that bring beams 331 and 333 parallel to beam 332 at fibers 341 and 343. Although FIGS. 5A and 5B depict apparatus for three beams to three fibers, the basic configuration may be readily adapted to any number of beams and fibers.

Alternative embodiments of the optical interleaver are depicted in FIGS. 6A–7B.

Figure 6A:
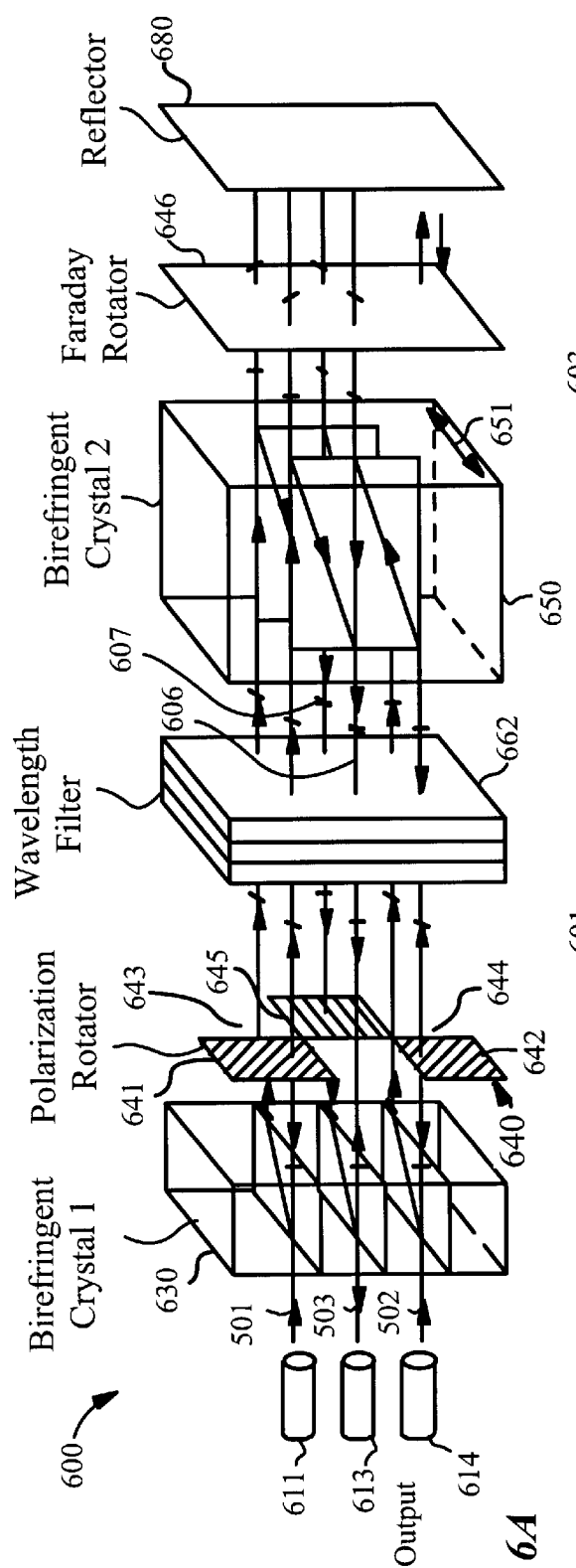
FIG. 6A depicts an isometric view of an optical interleaver according to a fourth embodiment of the present invention.
Figure 6B:
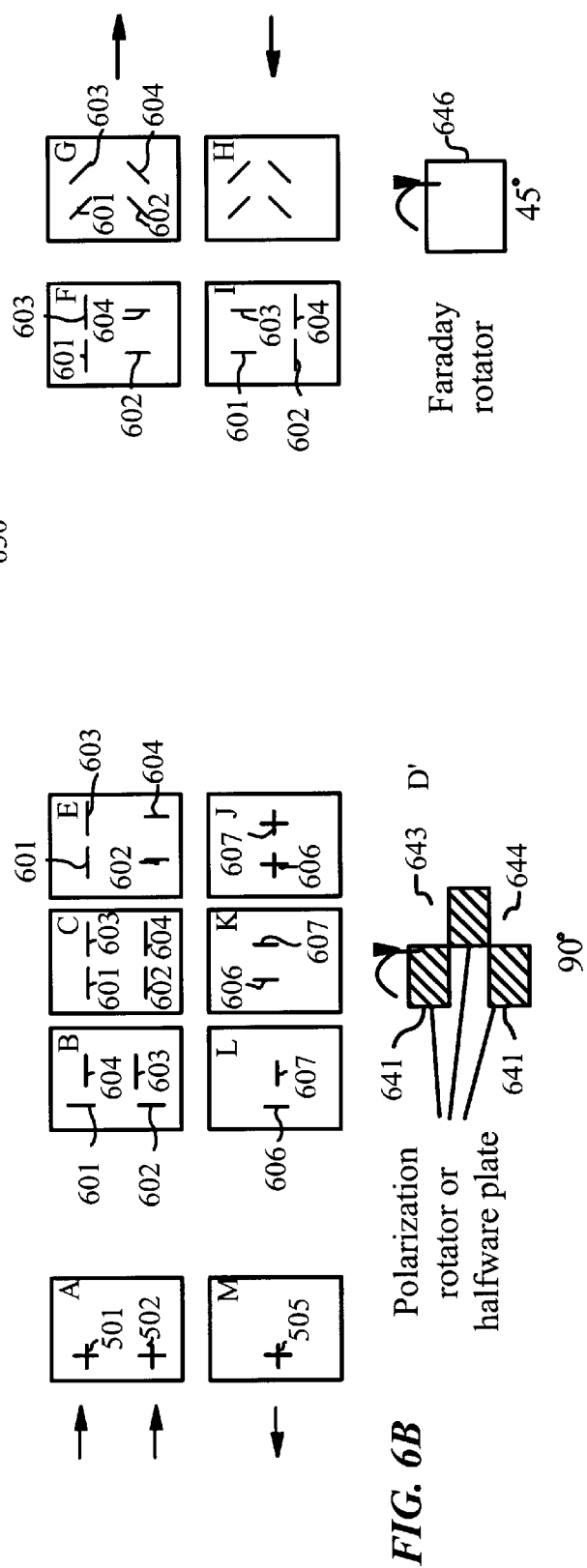
FIG. 6B depicts cross sectional schematic views of the polarization of light at different points in the optical interleaver of FIG. 6A.

FIG. 6A depicts an embodiment of optical interleaver 600 configured to operate as both a multiplexer and a de-multiplexer. FIG. 6B depicts the operation of each element of interleaver 600 in this configuration. When operating as a de-multiplexer, port 613 serves as an input while ports 611 and 614 serve as outputs. When operating as a multiplexer port 613 serves as an output while ports 611 and 614 serve as inputs. Multiplexer operation of interleaver 600 proceeds as follows. WDM signals 501 and 502 enter interleaver 600 at ports 611, 614 as shown at A in FIG. 6B. Channels 501, 502 include vertically polarized components 601, 602 and horizontally polarized component 603, 604 respectively as described above with respect to FIGS. 3A–4B. First birefringent element 630 spatially separates WDM signals 501, 502 into horizontally and vertically polarized components 601, 602, 603, 604 by a horizontal walk-off effect as shown at B in FIG. 6B.

Components 601, and 602 are respectively coupled to first and second portions 641, 642 of polarization rotator 640. Portions 641, 642 rotate the polarizations of vertically polarized components 601, 602 by 90° as shown at C in FIG. 6B. Portions 641, 642 of rotator 640 may be either reciprocal rotators such as waveplates or non-reciprocal rotators such as faraday rotators and the like. First and second portions 641, 642 of rotator 640 may rotate the polarizations of components 601, 602 by 90° in a clockwise or counter-clockwise sense. However, horizontally polarized components 603, 604 pass through gaps 643, 644 and their respective polarizations are not rotated. Consequently components 601, 602, 603 and 604 are all polarized parallel to each other as shown at C in FIG. 6B.

Wavelength filter 662 selectively rotates the polarization of wavelengths in either the first or second channel as described above. For example filter 662 rotates the polarization of wavelengths corresponding to signal 502 by 90°. As a result components 602 and 604 are rotated by 90° while components 601 and 603 are not. Thus, components 601 and 603 of signal 501 are horizontally polarized but components 602 and 604 of signal 502 are vertically polarized as shown at E in FIG. 6B.

Components 601, 602, 603, and 604, are coupled to second birefringent element 650. Birefringent element 650 has an optic axis 651 configured such that components 601 and 603 vertically walk off from components 602, 604 as shown at F in FIG. 6B.

Components 601, 602, 603, and 604 are coupled to non-reciprocal rotator 646 and reflector 680. Rotator 646 rotates the polarizations of components 601, 602, 603, and 604 by 45° clockwise as shown at G in FIG. 6B. Reflector 680 reflects components 601, 602, 603, and 604 back through the optical elements of interleaver 600 in reverse order. Upon reflection by reflector 680 the polarizations of components 601, 602, 603, and 604 are configured as shown at H in FIG. 6B. In cross-sections H–N, the view along the direction of propagation is now towards left in FIG. 6A.

Along the reverse path, components 601, 602, 603, and 604 are again rotated 45° clockwise by rotator 646, so that components 602, 604 are polarized vertically and components 601, 603 are polarized horizontally as shown at I in FIG. 4B. As such, components 601, 603 are ordinary rays and components 602, 604 are extraordinary rays on the return trip through birefringent element 650. Therefore, birefringent element 650 walks beams 602, 604 towards beams 601, 603 to combine them into beams 606 and 607 respectively as shown at J in FIG. 6B.

Beams 606 and 607 then pass back through wavelength filter 662 where the horizontally polarized components 602, 604 corresponding to wavelengths in signal 502 are rotated by 90°. Consequently, all wavelengths in signals 601, 602, 603 and 604 are all vertically polarized as shown at K in FIG. 6B. Beams 606 and 607 then pass back through rotator 640. Third portion 645 rotates the polarizations of components 603, 604 by 90° as shown at L in FIG. 6B. Beam 606, however, passes through gap 647 and, thus, the polarizations of components 601, 602, are not rotated. Components 601, 602 are therefore ordinary rays in birefringent element 630 while beams 603, 604 are extraordinary rays. Therefore, birefringent element 630 walks beam 606 towards beam 607. Beam 601 combines with beam 603 to form output signal 505 as shown at M in FIG. 6B. Output signal 505 is then coupled to port 613.

Those skilled in the art will recognize that interleaver 600 may operate as de-multiplexer by starting with an input signal at port 613 reversing the order of steps A–M shown in FIG. 6B.

FIG. 7A depicts another alternative embodiment of an optical interleaver 700 configured to operate as both a multiplexer and a de-multiplexer. FIG. 7B depicts the operation of each element of interleaver 700 in this configuration. When operating as a de-multiplexer, port 713 serves as an input while ports 711 and 714 serve as outputs. When operating as a multiplexer port 713 serves as an output while ports 711 and 714 serve as inputs. De-multiplexer operation of interleaver 700 proceeds as follows. WDM signal 701 enters interleaver 700 at port 713 as shown at A in FIG. 7B. WDM signal 701 contains channels 702 and 703 Channel 702 includes a vertically polarized component 704 and a horizontally polarized component 706. Similarly channel 703 includes a vertically polarized component 705 and a horizontally polarized component 707. First birefringent element 730 spatially separates WDM signal 701 into horizontally and vertically polarized components 701A, 701B by a horizontal walk-off effect as shown at B in FIG. 7B.

Components 701A, and 701B are coupled to polarization rotator 740. Rotator 740 has first and second rotator portions 741, 742 and first and second gaps 743, 744. Portions 741, 742 rotate the polarization of light by 90°. Portions 741, 742 of rotator 740 may be either reciprocal rotators such as waveplates or non-reciprocal rotators such as faraday rotators and the like. First and second rotator portions 741, 742 may rotate the polarizations of light in a clockwise or counter-clockwise sense. Component 701A passes through gap 743 while component 701B passes through first rotator portion 741. Thus, component 701A is not rotated while component 701B is rotated by 90° so that components 701A, 701B are parallel to each other, i.e., both vertical as shown in FIG. 7B.

Wavelength filter 762 is configured such that light travelling to or from port 713 will be filtered and light travelling to or from ports 711, 714 will bypasses filter 762. Wavelength filter 762 selectively rotates the polarization of wavelengths in either the first or second channel as described above. For example filter 762 rotates the polarization of wavelengths corresponding to signal 702 by 90°. As a result components 704 and 706 are rotated by 90° while components 705 and 707 of channel 703 are not. Thus, components 704 and 706 of signal 702 are horizontally polarized but components 705 and 707 of signal 703 are vertically polarized as shown at D in FIG. 7B.

Components 704, 705, 706, and 707, are coupled to second birefringent element 750. Birefringent element 750 has an optic axis 751 configured such that components 705 and 707 vertically walk off from components 704, 706 as shown at E in FIG. 7B.

Components 704, 705, 706, and 707 are coupled to non-reciprocal rotator 746 and reflector 780. Rotator 746 rotates the polarizations of components 704, 705, 706, and 707 by 45° clockwise as shown at F in FIG. 7B. Reflector 780 reflects components 704, 705, 706, and 707 back through the optical elements of interleaver 700 in reverse order. Upon reflection by reflector 780 the polarizations of components 704, 705, 706, and 707 are configured as shown at G in FIG. 7B. In cross-sections H–N, the view along the direction of propagation is now towards left in FIG. 7A.

Along the reverse path, components 704, 705, 706, and 707 are again rotated 45° clockwise by rotator 746, so that components 704, 706 are polarized vertically and components 705, 707 are polarized horizontally as shown at H in FIG. 7B. As such, components 705, 707 are ordinary rays and components 704, 706 are extraordinary rays on the return trip through birefringent element 750. Therefore, birefringent element 750 walks beams 704, 706 off from beams 705, 707 as shown at I in FIG. 7B. The walk-off provides a sufficient separation between beams 704, 706 and beams 705, 707 so that all four beams bypass wavelength filter 762 on the return trip.

Beams 704, 705, 706 and 707 then bypass wavelength filter 762 and pass back through rotator 740. Beam 705 passes through second rotator portion 742. Beam 706 passes through first rotator portion 741. Beams 704 and 707 pass through gaps 743 and 744 respectively. Thus, the polarizations of components 705, 706, are rotated by 90° but the polarizations of components 704, 707 are not rotated at all. Consequently, components 704, 705 are polarized vertically and components 707, 707 are polarized horizontally. Components 704, 705 are therefore ordinary rays in birefringent element 730 while beams 706, 707 are extraordinary rays. Therefore, birefringent element 730 walks beam 706 towards beam 704 and beam 707 towards 705. Beam 704 combines with beam 706 to form output signal 702 and beam 705 combines with beam 707 to form output signal 703 as shown at K in FIG. 7B. Output signals 702, 703 are then coupled to ports 714 and 711 respectively.

Those skilled in the art will recognize that interleaver 700 may operate as multiplexer by starting with input signals at ports 711, 714 and reversing the order of steps A–K shown in FIGS. 7B. Furthermore, those skilled in the art will be able to devise other configurations of polarization rotator 740 and wavelength filter 762 that provide selective rotation as described above.

The interleavers of FIGS. 6A–7B use only one Faraday rotator, which further reduces insertion loss and cost. In interleaver 600 of FIGS. 6A–6B light passes through filter 662 twice. Therefore, channel isolation is somewhat better than in interleaver 700, where the light passes filter 762 only once. Insertion losses are somewhat lower in interleaver 700 since the light passes through the filter 762 only once. However, when isolation is not important (which is usually the case when the device is used to combine two light signals as in a multiplexer) interleaver 700 is a desirable design since insertion losses are lower and the filter is smaller. The embodiments depicted in FIGS. 6A–7B may include a compensation plate if necessary. Furthermore interleavers 600 and 700 may include a deflection plate and collimator as described with respect to FIGS. 5A and 5B.

It will be clear to one skilled in the art that the above embodiment may be altered in many ways without departing from the scope of the invention. For example, the compensation plate may be located anywhere along the optical path between an input and the corresponding output. Accordingly, the scope of the invention should be determined by the following claims and their legal equivalents.

What is claimed is:

1. An optical interleaver comprising:
    a) at least three input/output ports configured to transmit optical signals;
    b) a first birefringent element optically coupled to the at least three input/output ports;
    c) a first polarization rotator element optically coupled to the first birefringent element;
    d) a wavelength filter optically coupled to the first polarization rotator element;
    e) a second birefringent element optically coupled to the wavelength filter;
    f) a second polarization rotator element optically coupled to the second birefringent element; and
    g) a reflector optically coupled to the second polarization rotator element, wherein the reflector is configured to reflect an optical signal that travels from at least one of the at least three input/output ports through elements b)–f) back through elements b)–f) in reverse order to at least one of the at least three input/output ports.

2. The optical interleaver of claim 1 wherein at least one of the input/output ports includes a collimator coupled to at least one optical fiber.

3. The optical interleaver of claim 1 wherein the first birefringent element is made from a material chosen from the group consisting of calcite, rutile, lithium niobate, and a $YVO_4$ based crystal.

4. The optical interleaver of claim 1 further comprising a third polarization rotator element disposed between the first polarization rotator element and the wavelength filter.

5. The optical interleaver of claim 4 wherein said first and third polarization rotator elements are reciprocal rotators.

6. The optical interleaver of claim 5 wherein the second and third polarization rotator elements are configured to rotate polarizations of optical signals in the same direction as each other.

7. The optical interleaver of claim 4 wherein the second and third polarization rotator elements are configured to rotate polarizations of optical signals in directions opposite to each other.

8. The optical interleaver of claim 1 wherein the at least three input/output ports are all disposed adjacent to each other.

9. The optical interleaver claim 1 configured to operate as a multiplexer.

10. The optical interleaver claim 1 configured to operate as a router.

11. The optical interleaver of claim 1 further comprising:
    h) a compensation plate disposed along an optical path between at least one of the at least three input/output ports and the reflector.

12. The optical interleaver of claim 11 wherein the compensation plate is configured to compensate for a phase difference due to different optical path lengths for an ordinary ray and an extraordinary ray in the first birefringent element.

13. The optical interleaver of claim 1 wherein the first polarization rotator element includes one or more gaps that allow selected light beams to pass without polarization rotation.

14. The optical interleaver of claim 1 wherein the wavelength filter selectively rotates a polarization of an optical signal according to the wavelength of the signal.

15. The optical interleaver of claim 1 wherein the wavelength filter is configured to allow selected light beams to bypass the wavelength filter.

16. An optical multiplexer comprising:
    a) at least two input ports, each input port configured to receive optical signals from one or more optical fibers;
    b) at least one output port configured to transmit optical signals to one or more optical fiber;
    c) a first birefringent element optically coupled to the at least two input ports and the at least one output port, wherein the first birefringent element is configured to separate an optical signal from each of the input ports into an ordinary ray and an extraordinary ray;
    d) a first polarization rotator element optically coupled to the first birefringent element, wherein the first polarization rotator element is configured to rotate the polarizations of the ordinary and extraordinary rays in opposite directions;
    e) a second polarization rotator element optically coupled to the first polarization rotator element, wherein the second polarization rotator element is configured to rotate a polarization of a forward beam in a first sense and a polarization of a reverse beam in a second sense that is the same as the first sense;
    f) a wavelength filter optically coupled to the second polarization rotator element;
    g) a second birefringent element optically coupled to the wavelength filter;
    h) a third polarization rotator element optically coupled to the second birefringent element, wherein the third polarization rotator element is configured to rotate the polarizations of the forward and reverse beams in a sense opposite that of the second polarization rotator element; and
    i) a reflector optically coupled to the third polarization rotator element, wherein the reflector is configured to reflect an optical signal that travels from the at least two input ports through elements c)–h) back through elements c)–h) in reverse order to the at least one output port.

17. The optical multiplexer of claim 16 further comprising a compensation plate disposed along an optical path between at least one of the input or output ports and the reflector.

18. The optical multiplexer of claim 16 wherein the at least two input ports and the at least one output port are located on the same side of the first birefringent element.

19. An optical de-multiplexer comprising:
   a) at least one input port configured to transmit optical signals;
   b) at least two output ports configured to transmit optical signals;
   c) a first birefringent element optically coupled to the at least one input port and the at least two output ports, wherein the first birefringent element is configured to separate an optical signal from each of the input ports into an ordinary ray and an extraordinary ray;
   d) a first polarization rotator element optically coupled to the first birefringence element, wherein the first polarization rotator element is configured to rotate the polarizations of the ordinary and extraordinary rays in opposite directions;
   e) a second polarization rotator element optically coupled to the first polarization rotator element, wherein the second polarization rotator element is configured to rotate a polarization of a forward beam in a first direction and a polarization of a reverse beam in a second direction that is opposite the first direction;
   f) a wavelength filter optically coupled to the second polarization rotator element;
   g) a second birefringent element optically coupled to the wavelength filter;
   h) a third polarization rotator element optically coupled to the second birefringent element, wherein the third polarization rotator element is configured to rotate the polarizations of the forward and reverse beams in a sense the same as that of the second polarization rotator element; and
   i) a reflector optically coupled to the third polarization rotator element, wherein the reflector is configured to reflect an optical signal that travels from the input port through elements c)–h) back through elements c)–h) in reverse order to at least one of the at least two output ports.

20. The optical de-multiplexer of claim 19 further comprising a compensation plate disposed along an optical path between at least one of the input or output ports and the reflector.

21. The optical multiplexer of claim 19 wherein the at least one input port and the at least two output ports are located on the same side of the first birefringent element.

* * * * *